United States Patent
Dobrovich et al.

(10) Patent No.: US 11,829,418 B2
(45) Date of Patent: Nov. 28, 2023

(54) IDENTITY GRAPH DATA STRUCTURE WITH ENTITY-LEVEL OPT-INS

(71) Applicant: LiveRamp, Inc., San Francisco, CA (US)

(72) Inventors: Mike Dobrovich, Little Rock, AR (US); Erin Boelkens, Little Rock, AR (US)

(73) Assignee: LiveRamp, Inc., San Francisco, CA (US)

( * ) Notice: Subject to any disclaimer, the term of this patent is extended or adjusted under 35 U.S.C. 154(b) by 218 days.

(21) Appl. No.: 17/400,719

(22) Filed: Aug. 12, 2021

(65) Prior Publication Data

US 2023/0050284 A1 Feb. 16, 2023

(51) Int. Cl.
*G06F 16/901* (2019.01)
*G06F 16/215* (2019.01)

(52) U.S. Cl.
CPC ........ *G06F 16/9024* (2019.01); *G06F 16/215* (2019.01)

(58) Field of Classification Search
None
See application file for complete search history.

(56) References Cited

U.S. PATENT DOCUMENTS

| | | | |
|---|---|---|---|
| 8,275,870 B2 | 9/2012 | Czyzewicz et al. | |
| 8,732,208 B2 | 5/2014 | Lee et al. | |
| 8,966,043 B2 | 2/2015 | Rajkumar et al. | |
| 9,940,472 B2 | 4/2018 | Akkiraju et al. | |
| 10,031,925 B2 | 7/2018 | Nielsen et al. | |
| 10,193,882 B2 | 1/2019 | Benguerah et al. | |
| 10,296,761 B2 | 5/2019 | Jebara | |
| 10,341,430 B1 | 7/2019 | Badawy et al. | |
| 10,489,822 B2 | 11/2019 | Wiener et al. | |
| 2015/0127628 A1 | 5/2015 | Rathod | |
| 2017/0083916 A1 | 3/2017 | Fadli | |
| 2018/0336457 A1* | 11/2018 | Pal | G06N 3/045 |
| 2022/0318426 A1* | 10/2022 | Solheim | G06F 21/6245 |

(Continued)

OTHER PUBLICATIONS

Identity Graph: Connecting Data for Better Customer Relationships, downloaded from https://liveramp.com/our-platform/identity-graph/ on Apr. 6, 2020.

(Continued)

*Primary Examiner* — Alex Gofman
*Assistant Examiner* — Umar Mian

(57) ABSTRACT

A system and method for propagating an opt-in through an identity graph fully honors opt-in requests without otherwise modifying the graph data structure. From a node corresponding to the touchpoint of the opt-in, the graph is traversed to find the associated primary node, from which all connected edges are traversed. Nodes on paths that are not connected to other primary nodes are opted in, along with the primary node. Edges that lead to nodes which have edges to other primary nodes are not opted in, but only the edge from the primary node itself is opted in. If household nodes are used, an identifier for the person at the household node may be opted in without opting in other members of the household node by opting in only the edge between the primary opt-in node and the household node.

12 Claims, 3 Drawing Sheets

(56) References Cited

U.S. PATENT DOCUMENTS

2022/0382713 A1* 12/2022 Sadiq ................ G06F 16/2471

OTHER PUBLICATIONS

Leonard, Matt et al., "Managing Customer Opt-Outs in a Complex Global Environment," CEAS (Jul. 2004).
Aziz, Kevin Daniel et al., "Graph Tracker: A User Opt-In Approach to Web Tracking," Syracuse University Surface 905 (2015).

* cited by examiner

IDENTITY GRAPH DATA STRUCTURE WITH ENTITY-LEVEL OPT-INS

BACKGROUND

Data concerning objects may be stored in a graph data structure, also referred to as a data graph. In a data graph, the nodes of the graph are the data elements and the edges are the relationships between the data elements. An identity graph is a particular type of data graph used to store and utilize data pertaining to natural persons, households of natural persons, or businesses (collectively herein, "objects.") The edges in an identity graph are used to link together data pertaining to the same object. The nodes may include various touchpoints that are associated with the same object, such as, for example, a name, address, email address, telephone number, and the like. There also may be "primary" nodes for natural persons or businesses, which link to each associated touchpoint, as well as household nodes. By using the data structure of an identity graph, all touchpoints related to the same object may be easily identified by following the edges connecting the touchpoint nodes. This structure thus enables a comprehensive understanding of each object for which data is maintained, in a way that makes that data easily and quickly searchable and accessible.

When an identity graph contains data pertaining to natural persons and is used in order to create interactions with such persons, then the identity graph provider must ensure that all laws, rules, and regulations concerning the use of personal data are followed. Among these rules are "opt-in" requirements, that is, the requirement that when a person provides consent for the identity graph provider to use their data for allowed purposes, that this request can be honored in such a manner as to meet the expectations of that person. It would be desirable to develop a system and method for manipulating an identity graph data structure in order to manage opt-ins in order to enable consumer opt-in capabilities and to comply with applicable laws, rules, and regulations, but without otherwise reducing the integrity or accuracy of the identity graph. Such a system and method would also further privacy goals by allowing products and services to be provided in a way that more closely adheres to the expectations that consumers have concerning their opt-in instructions and preferences.

References mentioned in this background section are not admitted to be prior art with respect to the present invention.

SUMMARY

The present invention in certain implementations is directed to a system and method for propagating an opt-in through an identity graph, such that users of the data graph will fully honor opt-in requests but without otherwise damaging the completeness or accuracy of the graph. When a node corresponding to a touchpoint is opted in, the graph is traversed to find the "primary" node tied to the opted-in touchpoint. From that node, all connected edges are traversed. Nodes on these paths that are not connected to other primary nodes are also opted in. Edges that lead to nodes which have edges to other primary nodes are not opted in, but the edge itself is opted in. Likewise, household nodes may in certain implementations be used that are linked to primary nodes, and an identifier for the person at the household node may be opted in, without opting in the household node entirely. By selectively opting in touchpoint nodes, primary nodes, household node identifiers, and edges in this manner, the invention achieves a data structure that retains its completeness and integrity, but allows its user to fully honor opt-in requests as well as later requests to rescind the opt-in instruction.

These and other features, objects and advantages of the present invention will become better understood from a consideration of the following detailed description of the preferred embodiments in conjunction with the drawings and appended claims.

DRAWINGS

DETAILED DESCRIPTION OF CERTAIN EMBODIMENTS

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 1:
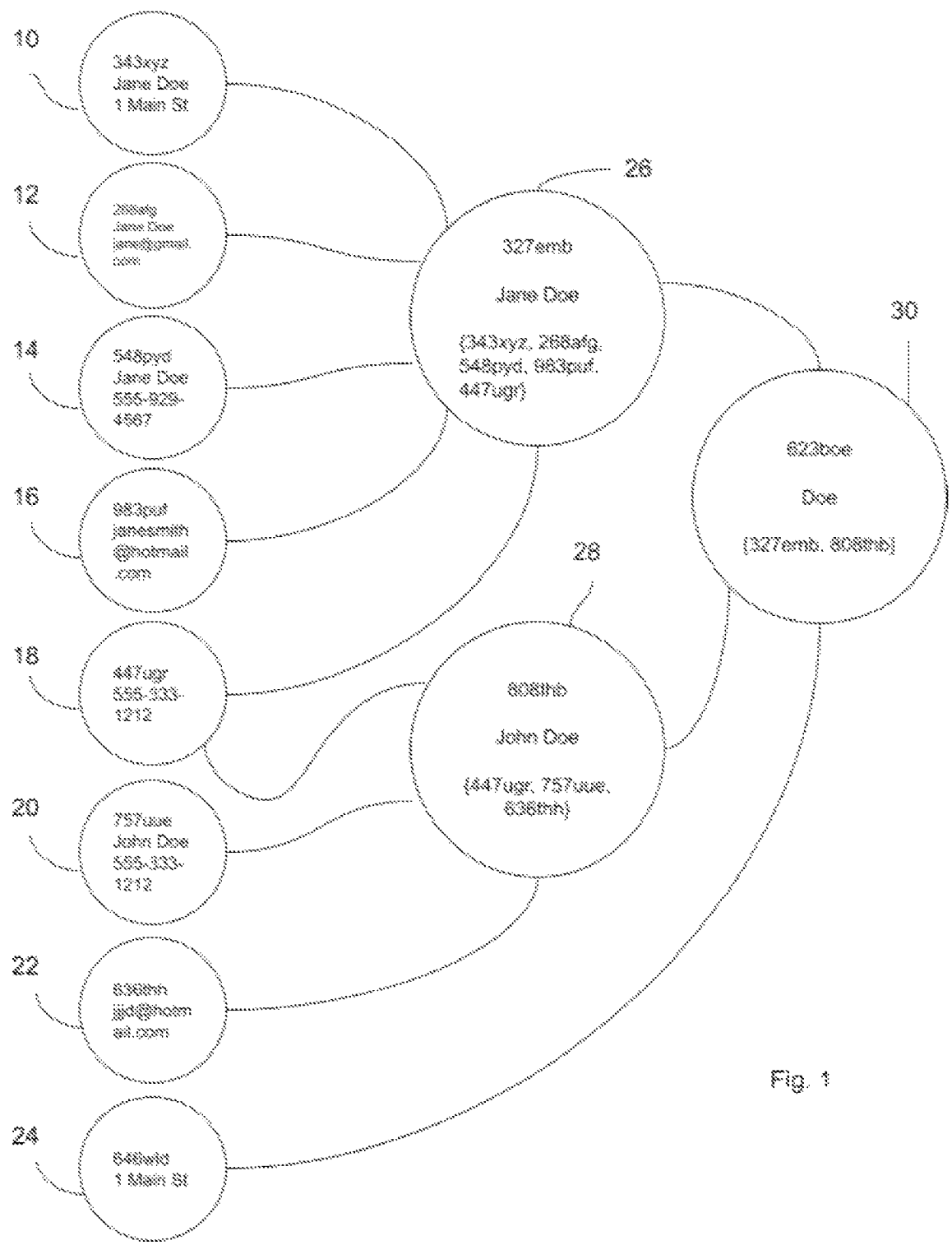
FIG. 1 is a logical data structure diagram of an exemplary portion of an identity graph before application of opt-ins, according to an implementation of the present invention.

One implementation of a method for performing opt-ins in an exemplar identity graph will be described with reference to FIG. 1. In FIG. 1, nodes 10, 12, 14, 16, 18, 20, 22, and 24 are those that pertain to particular touchpoints related to a person; nodes 26 and 28 are "primary" nodes for such persons; and node 30 is a primary node for the household of such persons. This example illustrates only a tiny part of a commercial data graph, which could contain billions of nodes. Each node contains a unique identifier for that node's data, as well as the data itself. Primary nodes also contain the unique identifiers for all touchpoints associated with the primary node as an implementation of the associated edges, and household nodes contain the unique identifier for each person associated with the household.

Figure 2:
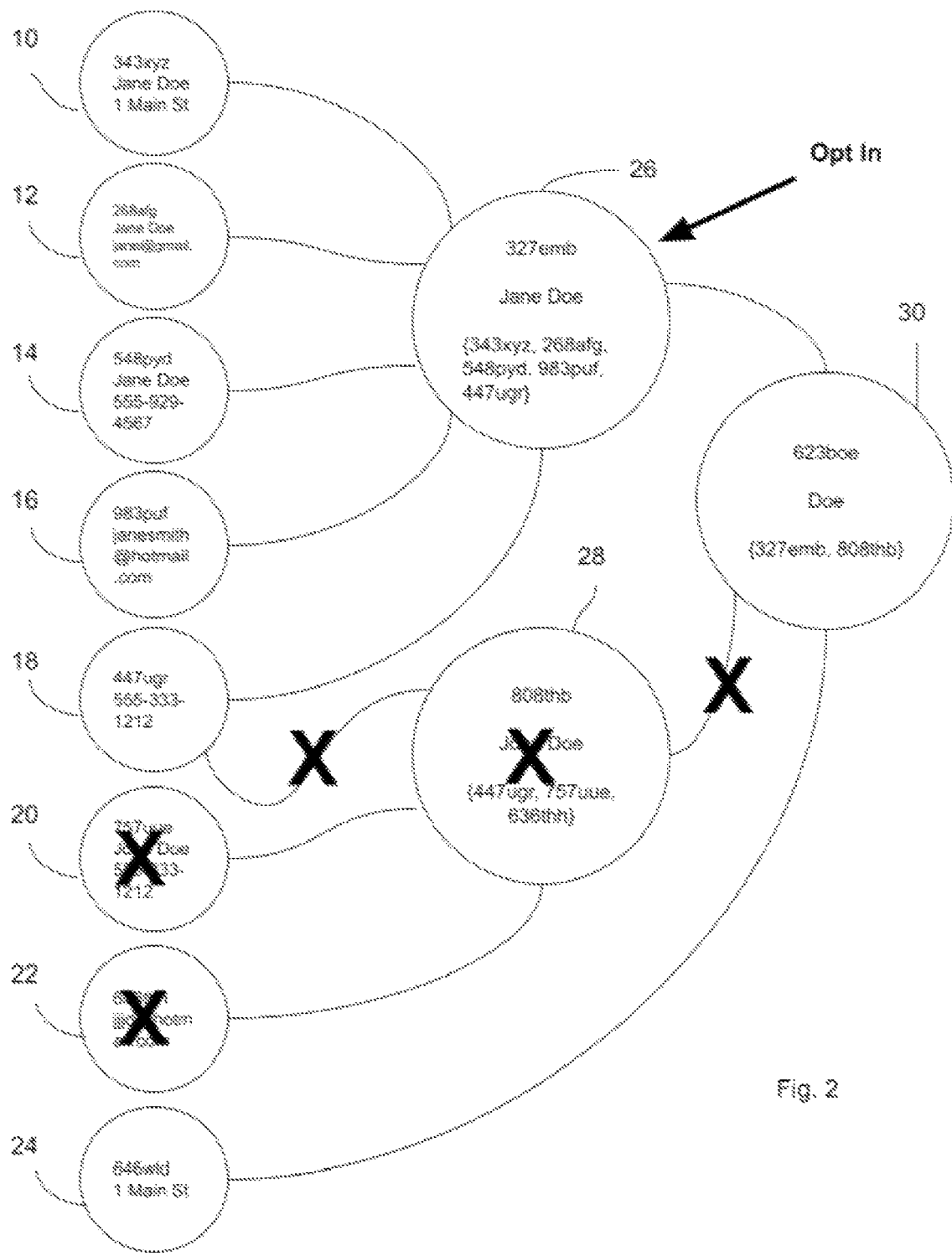
FIG. 2 is a logical data structure diagram of the exemplary portion of an identity graph from FIG. 1 after application of opt-ins, according to an implementation of the present invention.

FIG. 2 illustrates the process for opting in the person "Jane Doe" in response to the receipt of an opt-in request from such person, where an "X" is used to mark nodes and edges that are not opted in according to the process to be described. Suppose that the response is received from the email address jane@gmail.com, represented as touchpoint node 12. After node 12 is marked as opted in, then the graph is traversed along the corresponding edge up to the primary node 26 associated with that touchpoint node 12. This primary node 26 is likewise marked as opted in.

The next step is to traverse the graph to each other touchpoint node connected to this primary node 26. As each such touchpoint node is reached, the node itself is marked as opted in if the node has no edge connected to it other than the one to the opted-in primary node. Thus, the touchpoint node 10 for the address "1 Main St," node 14 for telephone number "555-123-4567," and node 16 for email address "janedoe@hotmail.com" are also opted in because they have edges that connect only to the "Jane Doe" primary node 26. In the case of the touchpoint node 18 for the telephone number "555-333-1212," however, it will be seen that this node has edges not only to the primary node 26 for "Jane Doe," but also to the primary node 28 for "John Doe." Therefore, the touchpoint node 18 in this case is not opted in entirely because it is associated with a primary node that is not opted in; instead, only the edge between the touchpoint node 18 and the "Jane Doe" primary node 26 is opted in. Finally, it will be seen that the household node 30 has edges to both the primary node 26 for "Jane Doe" and the primary node 28 for "John Doe." The household node 30 itself is not entirely opted in but the edge that connects it to the primary node 26 is opted in, while the edge that connects it to the primary node 28 is not opted in. The opt-in may, in certain implementations, be implemented as a field or flag associated with each node and edge within the associated data structure.

It may be understood that once the opt-in method identified above has been completed, then future uses of the identity graph will make responses for opt-in requests automatic. Any attempt to use touchpoints associated only with the person "Jane Doe" will be flagged as opted in, and permitted to return messages. Likewise, if there is an attempt to use the telephone number "501-333-1212" for purposes of generating a message, then this will only be allowed if the associated name is "Jane Doe" rather than "John Doe," since the edge between this touchpoint node 18 and the primary node 28 for "John Doe" is not opted in. Any messages intended to be directed to the person "Jane Doe" likewise will receive an opt-in response and the message will be permitted and generated. Finally, any attempt to generate a message for the "Doe" household will only be successful if connected to the person "Jane Doe" rather than the person "John Doe." Thus, the opt-in request of the natural person "Jane Doe" is fully honored, without compromising the integrity or completeness of the identity graph as would occur if nodes and edges that were not opted in were deleted.

It will further be understood that the method described above for propagating opt-ins in an identity graph will facilitate future processing when changes to the identity graph are entered. Any new touchpoint node added that has an edge only to the "Jane Doe" primary node 26 will be marked opted-in. This is possible through the resolution and graph traversal techniques previously described. By first connecting the new touchpoint node to the primary node, traversal is then possible to identify and correctly mark the newly added node, whereas previously the new node would only be marked as an opted-in node if there was a specific request made using the same touchpoint that was used to create the node. This new method leads to a complete and continual opting in of the individual versus the prior methods. If a new touchpoint is added with multiple edges, then only the edge connected to the "Jane Doe" primary node 26 will be opted in. If a new primary node is added and an edge is added to connect this new primary node to the "Doe" household node 30, then the identifier for the new primary node will not be opted in, but the identifier for the "Jane Doe" primary node 26 will remain opted in.

If at a future time the person Jane Doe decides to rescind the previous opt-in request, then the rescission may be propagated through the identity graph in a manner similar to entry of the earlier opt-in. By maintaining the connectivity of all known touchpoints to the primary node and applying consistent marking across all nodes, it is possible to reverse the opt-in of the entire primary node should a request to do so be made. As no data was lost in the opt-in processing, all of the necessary data in order to rescind the opt-in remains complete within the identity graph. In prior methods, a lack of connectivity could have led to a partial rescission of the applied opt-in, thereby failing to meet the expectations of the person requesting the rescission.

Figure 3:
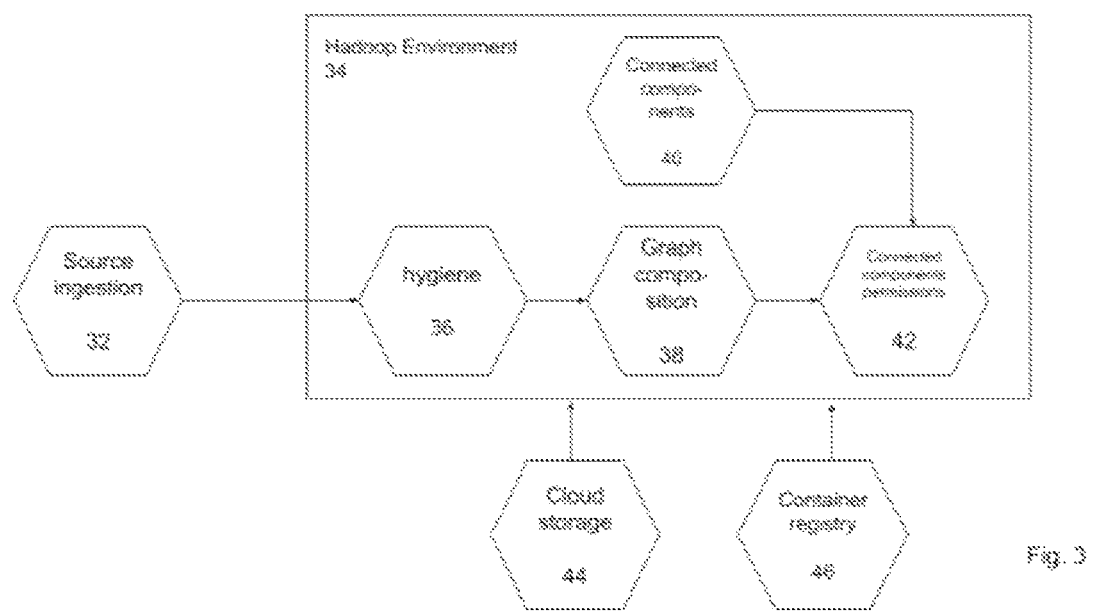
FIG. 3 is a system hardware diagram for an implementation of the present invention.

FIG. 3 illustrates a networked computer system for facilitating the method described above. New data (including opt-in requests) are received at the source ingestion processor 32. The request or data is then properly formatted for use in the data environment, in this case implemented using Hadoop utilities, although other implementations may be used in alternative embodiments. Apache Hadoop is a software suite that facilitates the use of many networked computer servers for processing extremely large data sets utilizing distributed storage and processing.

Data received at source ingestion processor 32 is subjected to data "hygiene," which involves standardization and correction of the data at hygiene processor 36. For example, typographical errors may be corrected here and addresses may be standardized to the correct postal format. Processing then moves to the graph composition processor 38, which is responsible for creating and maintaining all of the nodes within the identity graph. The connected component suppression processor 42 then uses the connected components processor 40 in order to propagate opt-ins or the rescission of opt-ins according to the method described above. The data including the data graph is stored within the cloud at cloud storage 44 in a Hadoop environment. Container registry 46 may be used in order to provide secure access to private Docker container storage on the Google Cloud Platform.

The systems and methods described herein may in various embodiments be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, other mobile computing device, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memories may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™, or mobile computing device operating systems such as iOS™. Any or all of program instructions may be provided as a computer program product, or software, that may include a non-transitory computer-readable storage medium having stored thereon instructions which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included in the disclosure. All references cited herein are hereby incorporated by reference to the extent that there is no inconsistency with the disclosure of this specification. When a range is used herein, all points within the range and all subranges within the range are intended to be included in the disclosure.

The present invention has been described with reference to certain preferred and alternative implementations that are intended to be exemplary only and not limited to the full scope of the present invention.

The invention claimed is:

1. A method for managing opt-in requests in an identity graph data structure implemented in a computer system comprising a processor coupled to a memory wherein at least a portion of the identity graph data structure is stored in the memory, the method comprising the steps of:
   receiving an opt-in notification from a touchpoint at the identity graph, wherein the identity graph comprises a plurality of touchpoint nodes, a plurality of primary nodes, and a plurality of edges connecting between one of the plurality of touchpoint nodes and one of the plurality of primary nodes;
   identifying a corresponding touchpoint node in the identity graph, and opting in the corresponding touchpoint node;
   traversing the identity graph along at least one of the plurality of edges from the corresponding touchpoint node to a corresponding primary node, and opting in the corresponding primary node;
   traversing the identity graph along at least one of the plurality of edges from the corresponding primary node to each of the plurality of touchpoint nodes that are connected to the corresponding primary node other than the corresponding touchpoint node, opting in each of the plurality of touchpoint nodes that are connected to the corresponding primary node and that are not connected by one of the plurality of edges to any other of the plurality of primary nodes, and opting in each of the plurality of edges that connects the corresponding primary node to each of the plurality of touchpoint nodes that are connected to the corresponding primary node and that are connected by one of the plurality of edges to any other of the plurality of primary nodes.

2. The method of claim 1, wherein each of the plurality of touchpoint nodes comprises one of a plurality of touchpoint node identifiers.

3. The method of claim 2, wherein each of the plurality of primary nodes comprises one of a plurality of primary node identifiers and further comprises at least one of the plurality of touchpoint node identifiers.

4. The method of claim 3, wherein the identity graph further comprises a plurality of household nodes, wherein each household node is connected by one of the plurality of edges to at least one of the plurality of primary nodes, and further comprises the primary node identifier for each primary node connected by one of the plurality of edges to each household node, wherein the method further comprises the step of:

after opting in the corresponding primary node, traversing one of the plurality of edges connecting the primary node to a corresponding household node, and then opting in the primary node identifier for the corresponding primary node within the corresponding household node.

5. The method of claim 1, further comprising the steps of:
receiving an opt-in rescission notification from a touchpoint at the identity graph;
identifying a corresponding touchpoint node in the identity graph, and rescinding the opt-in of the corresponding touchpoint node;
traversing the identity graph along at least one edge from the corresponding touchpoint node to a corresponding primary node, and rescinding the opt-in out the corresponding primary node; and
traversing the identity graph along at least one edge from the corresponding primary node to each connected touchpoint node other than the corresponding touchpoint node, rescinding the opt in at each connected touchpoint node that is not connected by an edge to any other of the plurality of primary nodes, and rescinding the opt in at each edge that connects the corresponding primary node to each connected touchpoint node that is connected by an edge to any other of the plurality of primary nodes.

6. A machine for managing opt-ins for an identity graph data structure, the machine comprising a plurality of processors each coupled to at least one memory wherein at least a portion of the identity graph data structure is stored in the at least one memory, the identity graph comprising a plurality of touchpoint nodes, a plurality of primary nodes, and a plurality of edges connecting between one of the plurality of primary nodes and one of the plurality of touchpoint nodes, the plurality of processors comprising:
a source ingestion processor configured to receive an opt-in request from an outside source, the opt-in request comprising opt-in data;
a hygiene processor in electronic communication with the source ingestion processor, the hygiene processor configured to apply standardization and correction to the opt-in data;
a graph composition processor in electronic communication with the hygiene processor, the graph composition processor configured to build and maintain each of the plurality of touchpoint nodes, the plurality of primary nodes, and the plurality of edges within the identity graph data structure; and
a connected components processor and a connected components suppression processor in communication with the graph composition processor, the connected components processor and the connected components suppression processor configured to collectively propagate the opt-in through the identity graph data structure by identifying a corresponding touchpoint node and opting in the corresponding touchpoint node, traversing the identity graph data structure along at least one edge connected to the corresponding touchpoint node to a corresponding primary node and opting in the corresponding primary node, traversing the identity graph along at least one edge from the corresponding primary node to each of the plurality of touchpoint nodes that are connected to the corresponding primary node other than the corresponding touchpoint node and opting in each of the plurality of touchpoint nodes that are connected to the corresponding primary node that are not connected by one of the edges to any other of the plurality of primary nodes, and opting in each of the plurality of edges that connects the corresponding primary node to each of the plurality of touchpoint nodes that are connected by one of the plurality of edges to any other of the plurality of primary nodes.

7. The machine of claim 6, wherein the corresponding touchpoint node comprises a corresponding touchpoint node identifier, and wherein the connected components processor and connected components suppression processor are further configured to opt in the corresponding touchpoint node identifier.

8. The machine of claim 7, wherein each of the plurality of primary nodes comprises one of a plurality of primary node identifiers and further comprises at least one of the plurality of touchpoint node identifiers.

9. The machine of claim 8, wherein the identity graph data structure further comprises a plurality of household nodes, wherein each household node is connected by one of the plurality of edges to at least one of the plurality of primary nodes, and each of the plurality of household nodes comprises a household node identifier from a set of household node identifiers, and further comprises the primary node identifier for each primary node connected by one of the plurality of edges to each household node.

10. The machine of claim 9, wherein the connected components processor and connected components suppression processor are further configured to, after opting in the corresponding primary node, traversing one of the plurality of edges connecting the primary node to a corresponding household node, and then opting in the primary node identifier for the corresponding primary node within the corresponding household node.

11. The machine of claim 6, wherein the source ingestion processor is further configured to receive an opt-in rescission request from an outside source, the opt-in rescission request comprising opt-in rescission data.

12. The machine of claim 11, wherein the connected components processor and connected components suppression processor are further configured to identify a corresponding touchpoint node in the identity graph data structure and rescind the opt-in of the corresponding touchpoint node, traverse the identity graph along at least one edge from the corresponding touchpoint node to a corresponding primary node, and rescind the opt-in to the corresponding primary node, and traverse the identity graph along at least one edge from the corresponding primary node to each connected touchpoint node other than the corresponding touchpoint node, rescind the opt-in at each connected touchpoint node that is not connected by an edge to any other of the plurality of primary nodes, and rescind the opt-in at each edge that connects the corresponding primary node to each connected touchpoint node that is connected by an edge to any other of the plurality of primary nodes.

* * * * *